Feb. 19, 1935.   J. C. MARTIN, JR   1,991,904
LOCOMOTIVE BOILER
Filed Aug. 25, 1931   6 Sheets-Sheet 1
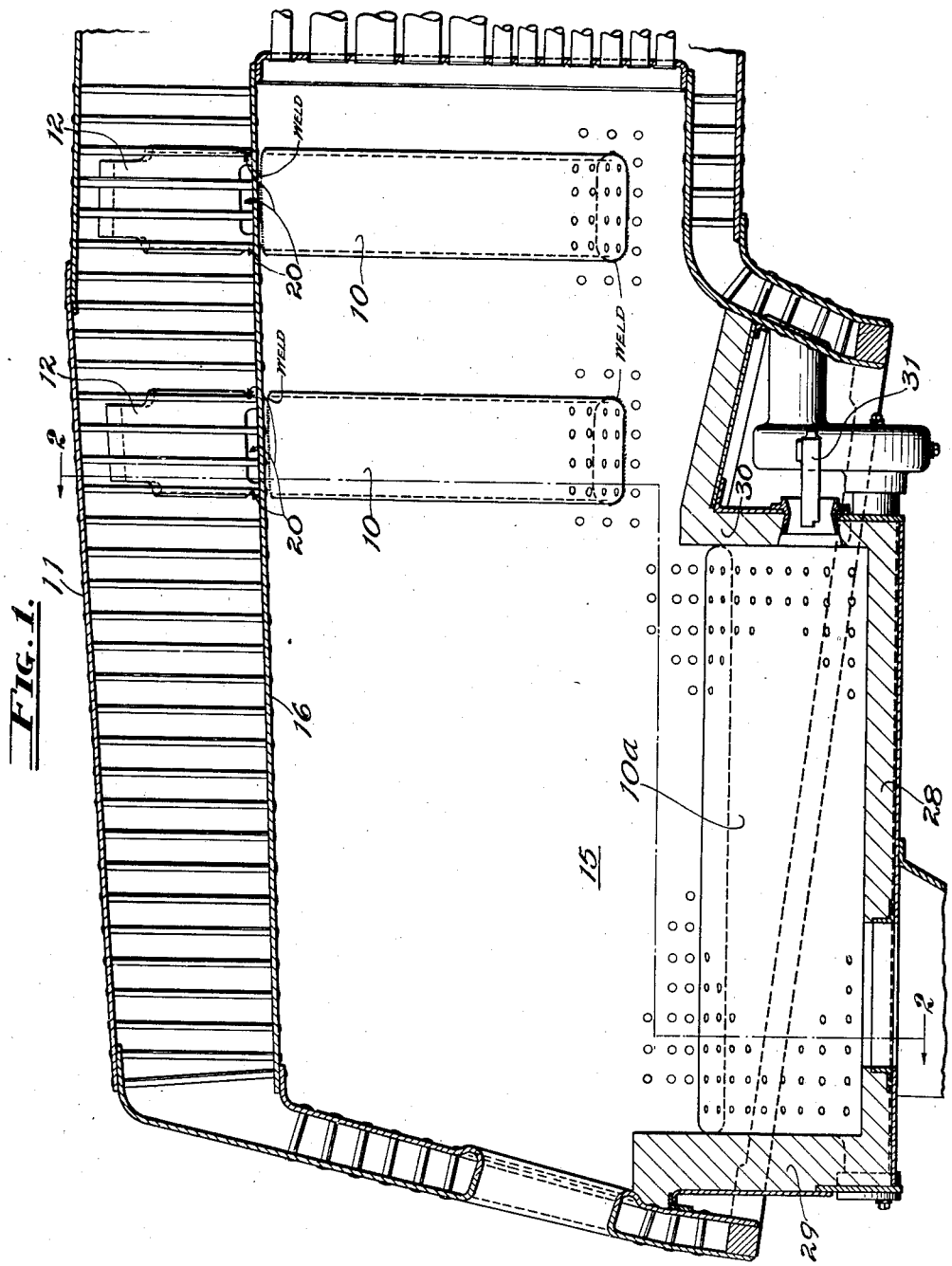
Inventor:
Jesse C. Martin, Jr.
By Brown & Phelps
Attorneys Feb. 19, 1935.  J. C. MARTIN, JR  1,991,904
LOCOMOTIVE BOILER
Filed Aug. 25, 1931  6 Sheets-Sheet 2
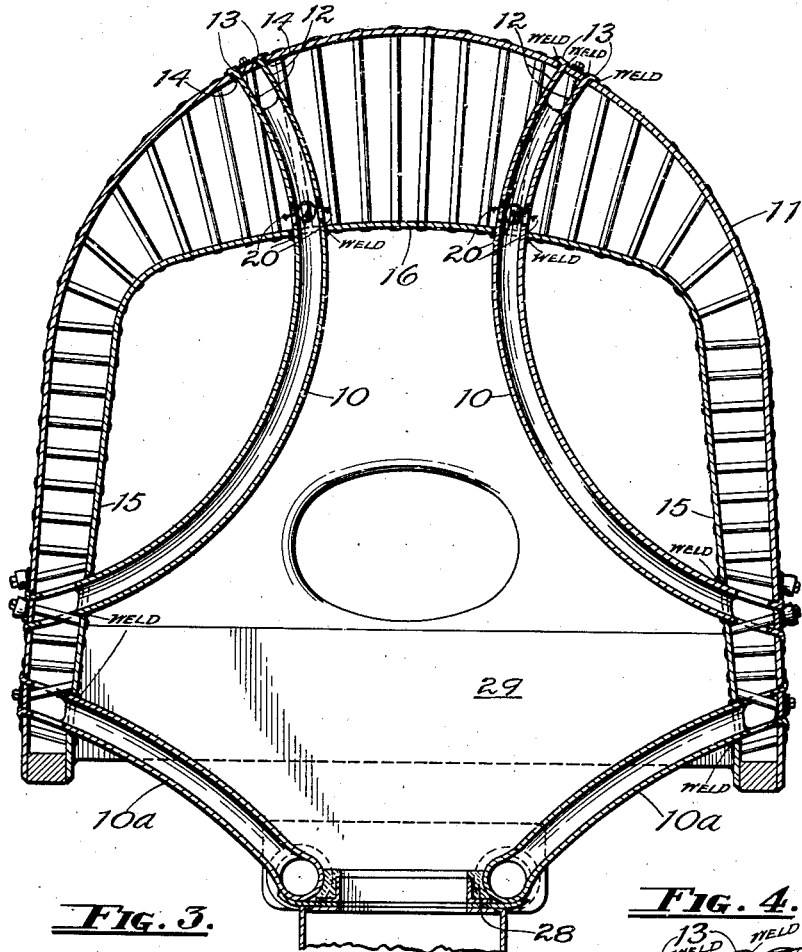
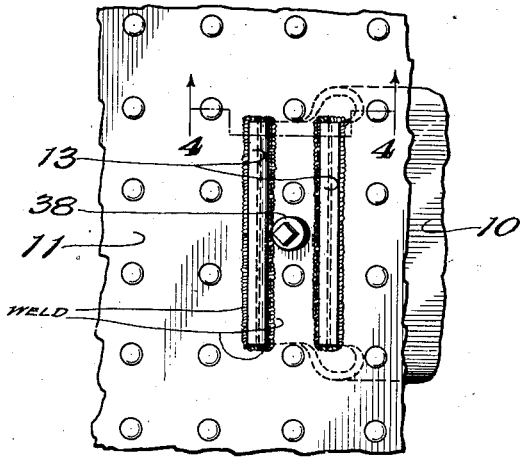
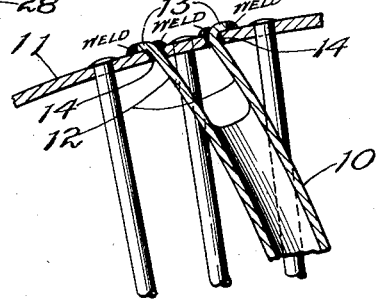
Inventor:
Jesse C. Martin, Jr.
By Brown & Phelps
Attorneys Feb. 19, 1935.   J. C. MARTIN, JR   1,991,904
LOCOMOTIVE BOILER
Filed Aug. 25, 1931   6 Sheets-Sheet 3
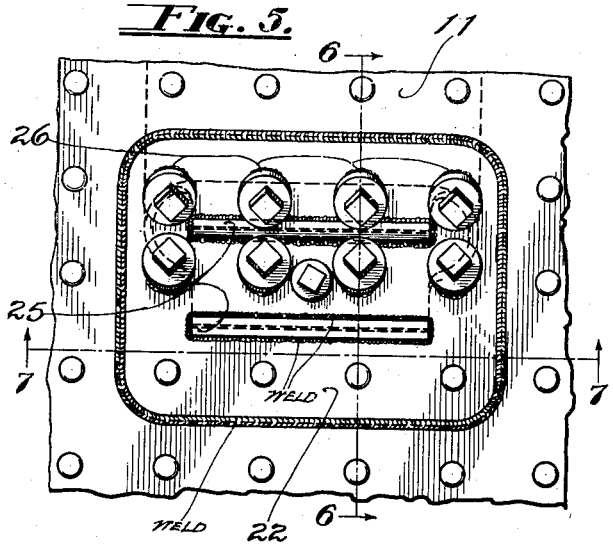
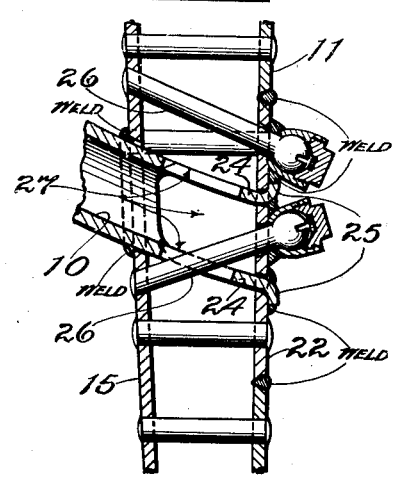
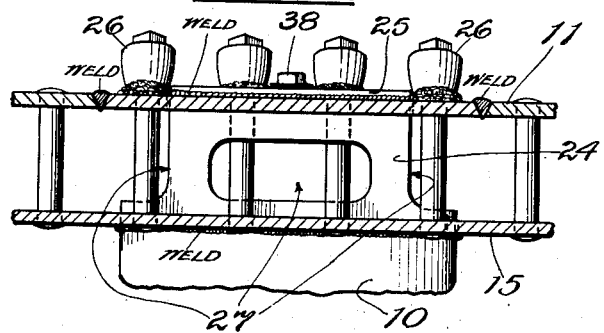
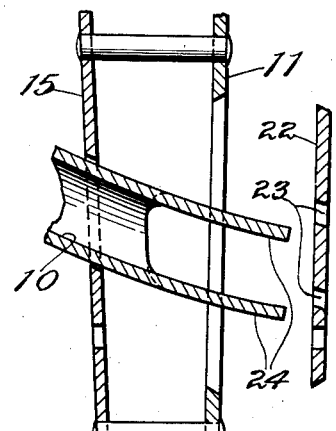
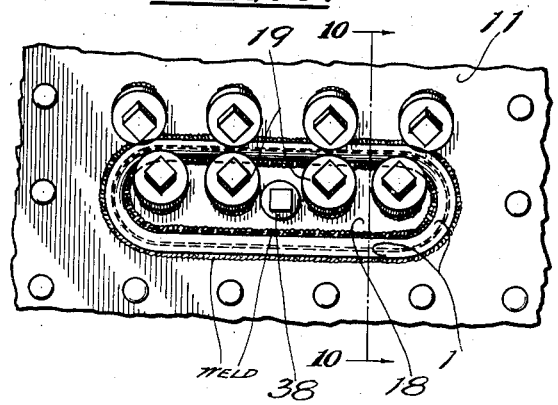
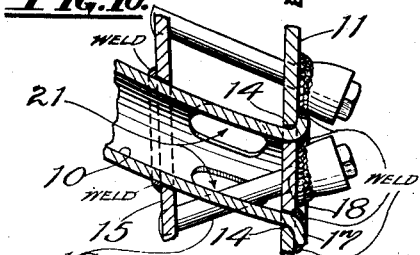
Inventor:
Jesse C. Martin, Jr.
By Brown & Phelps
Attorneys

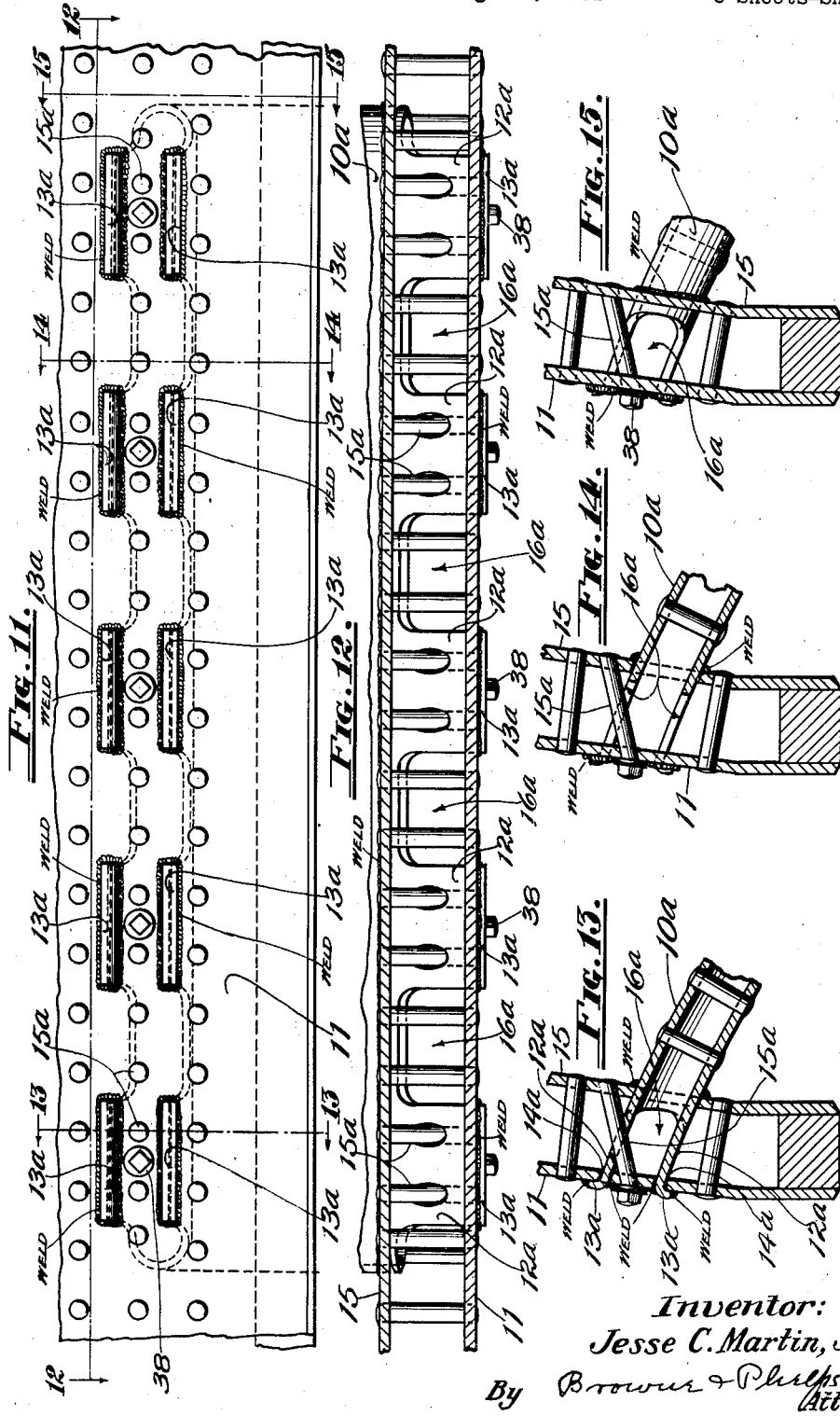

Feb. 19, 1935. J. C. MARTIN, JR 1,991,904
LOCOMOTIVE BOILER
Filed Aug. 25, 1931  6 Sheets-Sheet 5
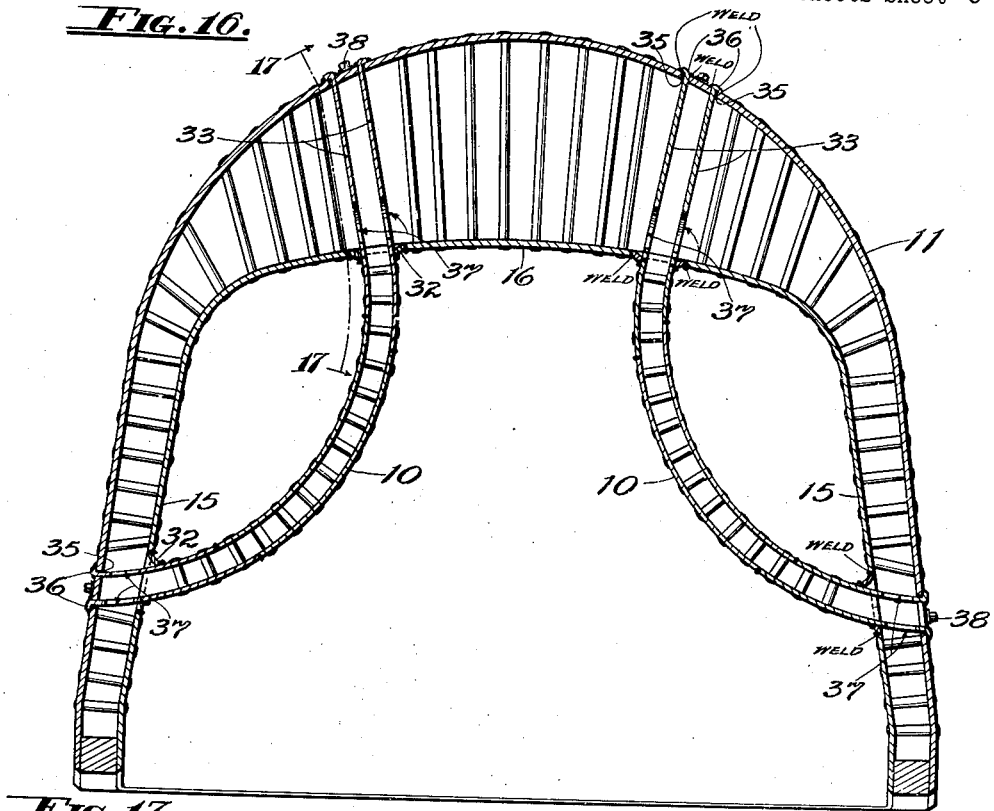
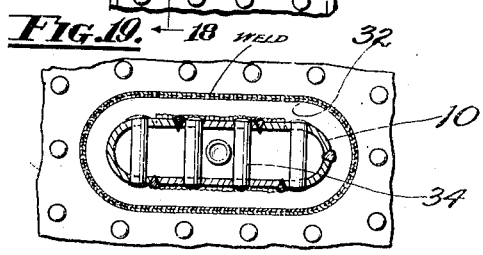
Inventor:
Jesse C. Martin, Jr.
By Brown & Phelps
Attorneys

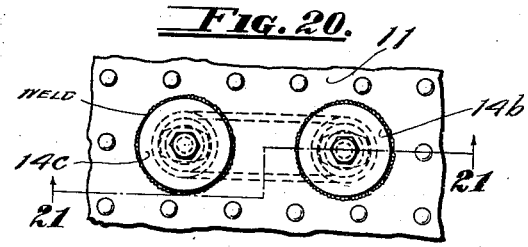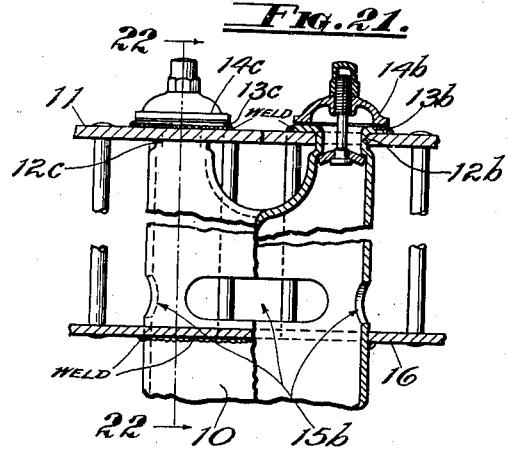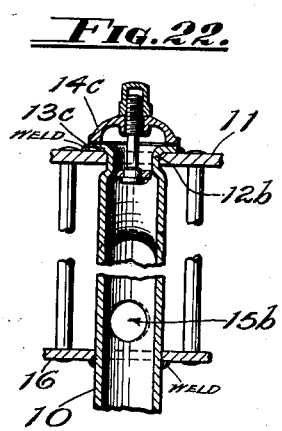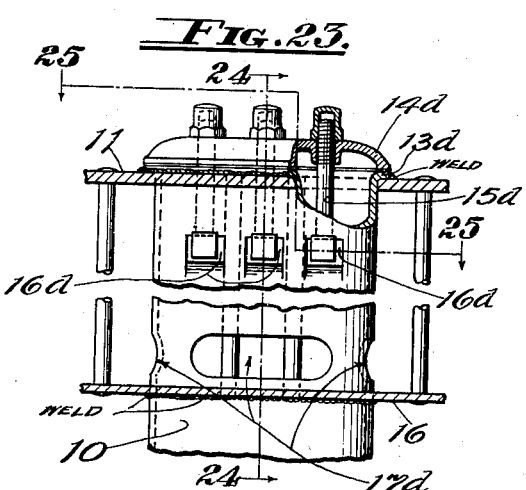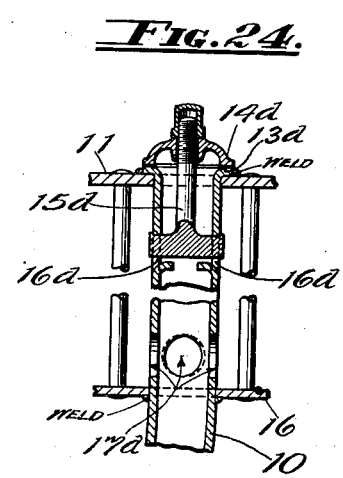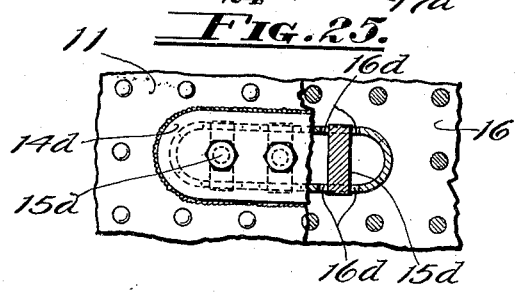

Patented Feb. 19, 1935

1,991,904

UNITED STATES PATENT OFFICE 1,991,904

LOCOMOTIVE BOILER

Jesse C. Martin, Jr., Los Angeles, Calif.

Application August 25, 1931, Serial No. 559,300

13 Claims. (Cl. 122—68)

The hereinafter described invention relates to water circulating steam generating elements as positioned in the firebox of a locomotive boiler for increasing the efficiency of steam generation and preserving the integrity of the metallic heating surfaces of the boiler and its firebox against corrosion and cracking.

My invention contemplates among its objects the provision of a connection for joining the ends of a steaming and circulating element to the sheets of a locomotive firebox, which will be out of the hot gases of combustion and not be subject to attack thereby; in fact, to carry the ends of the element through the water spaces of the firebox so that they can be attached directly to the outside shell or wrapper sheet of the firebox and in such manner that passages for water and steam will be made through the elements adjacent their ends in establishing the circulatory movement of water through the elements and the water in the spaces surrounding the firebox.

Another object of my improved construction is to place practically all of the strain of supporting the ends of my element upon the outside or shell sheets of the firebox, thereby relieving the firebox sheets from carrying an undue load at their juncture with the elements, and to weld the element around the opening cut through the firebox to permit its passage as well as the passage of its ends as connected to the shell or wrapper sheet in sealing the element to the firebox sheet and wrapper sheet against boiler pressure leakage.

Another object of my invention is to make a fluid tight welded connection of a water heated steam generating element to the sheets of the firebox and to carry the ends of the element through the water spaces of the firebox so that the ends are secured to the outside shell or wrapper sheet of the firebox as the principal support therefor, the wrapper sheet serving as a substantially indestructible portion of the firebox upon which the load of supporting the elements is sustained as distinguished from making a supporting attachment for the element ends to the firebox sheets which are of lighter metal than the wrapper sheet and being subjected directly to the heat of combustion do not provide as permanent a residing place for the element ends as the wrapper sheet.

Another object of my invention is to eliminate flat extending flange faces at the terminal connections of my improved elements, which faces require staybolts through them connected to the wrapper sheet of the firebox in order to support the flat unsupported flange faces against the boiler pressure, thereby saving the expense of cutting out the original staybolts of the firebox and inserting new staybolts in the flange faces while making a more reliable fastening for the terminal connections of my elements.

A further object of my invention is to construct a water carrying steam generating element for attachment to the sheets of a locomotive firebox wherein I form a welding edge at the end of the radius of the turned-over metal, that is so that there will be no flat face or extension beyond the knuckle or radius of turn-over of the metal, which flat face would provide an unsupported section of metal or flange face that would require staybolting to maintain it in butt welded engagement with the edge of the firebox sheet, and then through the novel construction of my invention to continue the ends of the element beyond its butt welded edge of the firebox sheet through the water spaces surrounding the firebox to the wrapper sheet of the firebox where the element ends are connected and the strain on the welded joint eliminated, in fact the load of carrying the element at its ends being transferred to the wrapper sheet, which is out of the heat of combustion.

A further object of my invention, in at least one of its embodiments, is to provide connecting ends for water circulating steam generating elements which will have portions butt-welded to the edges of the firebox sheets and which will be secured at the other portions to the wrapper sheet of the firebox with the new and novel feature and advantage of carrying the ends of the elements entirely by the wrapper sheet, that is, without consideration to the strength of the weld as a support for connecting the ends of the element and thereby giving to the welded joint the function only of sealing the joint against fluid leakage of the boiler.

Another object of my invention is to form an element for use in the water spaces surrounding a locomotive firebox in augmenting the circulation of water and generation of steam therethrough which can be applied from the outside of the firebox through the wrapper sheet thereof and connection of the ends of the element made directly to the wrapper sheet for supporting it while welding the element to the firebox sheets against boiler pressure leakage, this construction affording efficient advantages in cost of application through its novel form of insertion and attachment.

Another object of my invention is to provide attachment means for the ends of water circulating steam generating elements as positioned in the firebox of a locomotive boiler which can be turned over or crimped against the wrapper sheet of the firebox, taking the strain off the firebox sheets in supporting the element and relieving the welded joints sealing the element to the firebox sheets against carrying the load of supporting the element.

A further object of my invention is the utilization of the openings through the ends of the elements into the water spaces of the firebox so as to throttle or control the flow of water through the element at its point of discharge in effecting the most efficient circulatory movement of the water and more particularly in the discharge of the water over the crown sheet of the firebox in effecting a water covering therefor in the case of low water on the crown sheet.

A further object of my invention is to form a construction of water circulating steam generating element for attachment to the water spaces of a locomotive firebox which will incorporate all of the advantages of autogeneous welding in sealing the fluid tight joint against boiler pressure in its juncture with the firebox sheets while securing it to the wrapper sheet or surrounding shell of the firebox as the heaviest plate of the firebox out of the fire and consequently more permanent than the firebox sheets in assimilating the end load and terminal strains.

In order that my invention may be fully understood by those skilled in the art, reference is made to the illustrative embodiments set out on the accompanying drawings, in which, Fig. 1 is a sectional side elevation of the firebox of a locomotive boiler showing the steam generating water circulating elements of my construction as applied above the mud ring of the firebox, for the discharge of water from the legs over the crown sheet, as well as below the mud ring for the generation of steam and circulation of water upwardly through the elements and legs of the firebox, the particular setting as shown being adapted for burning injected fuel such as fuel oil.

Fig. 2 is a sectional end view taken on line 2—2, Fig. 1, looking toward the fire door opening and showing how the ends of my elements are brought through the water spaces surrounding the firebox and connected to the outside shell or wrapper sheet of the firebox.

Fig. 3 is a view showing a portion of the firebox wrapper sheet residing over the crown sheet of the firebox, illustrating how the ends of the crown sheet elements of my construction are joined to the wrapper sheet in the present instance by turning over the element end against the wrapper sheet in a slotted opening and welding the turned-over end to the sheet so as to seal the joint against boiler pressure leakage.

Fig. 4 is a sectional view taken on line 4—4, Fig. 3, to further illustrate how the element ends of this construction of my invention are secured to the wrapper sheet.

Fig. 5 is a broken portion of the firebox wrapper sheet taken at the lower portion of the water leg showing another form of making my element end attachment to the wrapper sheet, in this instance, by utilizing a plate welded and staybolted to the wrapper sheet in which slotted holes receive the element ends, the ends being turned over against the plate and welded thereto in fluid tight engagement.

Fig. 6 is a sectional view taken on line 6—6, while Fig. 7 is a sectional view taken on line 7—7, Fig. 5, the latter view showing the open communication at the ends of my elements with the water space surrounding the firebox.

Fig. 8 is a view illustrating the slotted plate of Fig. 5 and the element end before its two flat sides have passed through the slots and are turned over against the plate and welded thereto, in fact before the plate is welded and staybolted in place against the wrapper sheet.

Fig. 9 shows the form of my invention in which I bring the full end of the element through the wrapper sheet of the firebox, turning over its end and welding the contour of the turned-over edge to the wrapper sheet.

Fig. 10 is a sectional view taken on line 10—10, Fig. 9, showing the passages for fluid through the ends of the element into the water spaces surrounding the firebox.

Fig. 11 is a broken side elevation of the water leg of the firebox immediately above the mud ring showing how the ends of the water bottom form of my improved elements are secured to the wrapper sheet of the firebox by turning over portions of the element ends against the sheet at intervals along the length of the element and sealing the joint against the sheet by welding.

Fig. 12 is a section taken on line 12—12, Fig. 11, showing the element as positioned between the wrapper sheet and firebox sheet and joints as formed with the respective sheets by welding.

Fig. 13 is a section taken on line 13—13, Fig. 11, while Figs. 14 and 15 are sections taken on lines 14—14 and 15—15 respectively of Fig. 11.

Fig. 16 is a sectional end elevation of the firebox of a locomotive boiler illustrating another form of my improved steam generating water circulating elements wherein edges of the elements are welded to edges of the side sheets and crown sheet of the firebox and the ends of the elements are secured to the wrapper sheet of the firebox in protection of the welded joints against strains and leakage.

Fig. 17 is a section taken on line 17—17, Fig. 16, while Figs. 18 and 19 are sections taken on lines 18—18 and 19—19 respectively of Fig. 17.

Fig. 20 is a plan view showing a portion of the wrapper sheet of the firebox, taken for illustrative purposes over the crown sheet of the firebox, in which I secure the ends of my element to the wrapper sheet in such manner as to provide hand holes with removable washout covers.

Fig. 21 is a sectional broken side elevation taken on line 21—21, Fig. 20, while Fig. 22 is a broken sectional end elevation taken on line 22—22, Fig. 21.

Fig. 23 is a broken side elevation of the manhole embodiment of my invention connecting the element ends to the wrapper sheet of the firebox with a removable washout cover.

Fig. 24 is a broken sectional end elevation taken on line 24—24, Fig. 23, while Fig. 25 is a broken plan view taken on line 25—25, Fig. 23.

In the drawings Figs. 1 to 15 inclusive, numeral 10 denotes my improved form of element as applied to the locomotive firebox for the circulation of water and generation of steam between the legs of the firebox and the water space over the crown sheet, while numeral 10a denotes my improved steaming and circulating elements as used for forming the bottom of the firebox.

In these illustrative embodiments Figs. 1 to 4 inclusive I have shown the elements 10 with a single radius of curvature, this being the preferred form of my invention as best satisfying the strains of expansion and contraction existent in the firebox, continuing the curvature through the water spaces surrounding the firebox, where I connect the elements 10 to the firebox outer shell or wrapper sheet 11 by turning over the flattened sides 12, of its elongated cross-sectional shape against wrapper sheet 11 at 13. The sides of the elements 10 pass through slotted openings 14 made in wrapper sheet 11 to receive them, and may be said to be crimped over in providing holding surfaces against wrapper sheet 11.

In the drawings numeral 15 denotes the side sheets of the firebox and numeral 16 the crown sheet thereof.

The elements 10 pass through openings made in the respective firebox sheets which closely fit their exterior cross-sectional contour and in applying, which is preferably made from the outside of the firebox in this form of my invention, an opening also of the same exterior cross-sectional contour as the element 10 is made in wrapper sheet 11 near the bottom thereof so as to permit the element to be passed through the openings of wrapper sheet 11, side sheet 15 and crown sheet 16, and its flattened sides 12 to pass through the slotted openings 14 of wrapper sheet 11 at its top or crown sheet end. After the sides 12 of element 10 have passed through the slotted openings 14 they are turned over against wrapper sheet 11 as noted at 13 and their edges and sides are welded to wrapper sheet 11 in sealing the joints against fluid pressure leakage, this being clearly shown in the enlarged views, Figs. 3 and 4, marked "weld".

The bottom or water leg end of element 10 is joined to the wrapper sheet 11 by turning over its full contoured end against the opening in the wrapper sheet 11, through which it has been passed as noted at 17, this being well shown in the enlarged views, Figs. 9 and 10.

The opening through wrapper sheet 11, after the bottom end of element 10 has been turned over against it, is closed by plate 18 secured by staybolts 19, and the edges of the turned-over end 17 and the edges of the plate 18 are welded to the wrapper sheet 11 and the opening of element 10, as noted at "weld" in the drawings. After the element 10 has been secured in place against the wrapper sheet 11 and welded thereto, it is then welded to the side sheet 15 at its bottom end and to the crown sheet 16 at its top end as noted at "weld" in the drawings, thereby sealing the joints of the element at their juncture with the respective firebox sheets against boiler pressure leakage and taking the strain off the welded firebox joints by carrying the ends of the element 10 substantially entirely from the wrapper sheet 11 or outside shell surrounding the firebox. Passages as denoted by numeral 20, Figs. 1 and 2, provide communication between element 10 and the water space over the crown sheet 16, while passages as denoted by numeral 21, Fig. 10, provide communication between element 10 and the water legs of the firebox.

As an alternate way of connecting the ends of elements 10 to wrapper sheet 11, I may choose to cut a considerably larger opening in the wrapper sheet than the actual size of its cross-sectional contour as shown by Figs. 9 and 10, in fact as shown by Figs. 5, 6, 7 and 8 in which I employ a plate 22 of the same thickness as the wrapper sheet and cut slotted openings 23 therein, passing the flattened sides 24 of the element ends therethrough and turning same over against plate 22 at 25 in like manner as immediately above described in turning over the flattened sides 13 of element 10 against wrapper sheet 11 at its top or crown sheet end. The plate 22 is held by staybolts 26 and its edges and the edges of the opening in the wrapper sheet 11 as well as the edges of the turned-over sides 24 and slotted openings 23 are welded in joint formation as noted at "weld" in the drawings. Passages as denoted by numeral 27, Figs. 6 and 7, provide for the circulatory movement of water through element 10 into the water spaces surrounding the firebox.

All work of welding and staybolting in the structures of my invention is carried out in full conformity with rules and regulations as prescribed by Federal and State authorities.

My main object throughout, as will well be understood from the foregoing, is to carry the load or strain of supporting the steaming and circulating elements of my construction at their terminals substantially entirely from the wrapper sheet 11 of the firebox as a more permanent foundation than the firebox sheets, and to take the attaching ends as relied upon for supporting the element out of the heat of combustion.

In adapting the elements of my construction to the formation of a water bottom for the firebox, reference is now made to Figs. 11 to 15 inclusive, in which numeral 10a denotes the bottom element as joined to the wrapper sheet 11 of the firebox, in the present instance by the flattened side portions 12a thereof being turned over against wrapper sheet 11 at 13a. Slotted openings 14a are made through wrapper sheet 11 for the passage of the ends 12a therethrough; and in the case of a comparatively long element such as used in the formation of the water bottom, a plurality of connecting ends 12a are employed to better sustain the load of the element, all of which are turned over against wrapper sheet 11 as above described.

The edges of the turned-over ends 12a as well as the slotted openings 14a are sealed against the wrapper sheet by welding, while the longitudinally running sides and ends of element 10a at its juncture with the side sheets 15 of the firebox are also welded in fluid tight joint formation as noted in the drawings. Staybolts pass through the element ends as noted at 15a, and openings 16a permit ready communication for the passage of water through the element 10a into the legs of the firebox. A water bottom type of element of this character is usually employed in the burning of injected fuel or fuel oil, the elements being housed to the firebox sheets and a refractory bottom, flash wall and burner wall, 28, 29 and 30, respectively, used, while a burner, 31, injects the fuel into the firebox as shown in Fig. 1.

Figs. 16 to 19 inclusive cover the form of my invention in which I turn over the ends of the element 10 so as to form butt welding edges with the edges of openings cut in the firebox sheets while carrying plates attached to the ends of the element through the water spaces surrounding the firebox and attaching the plate ends to the wrapper sheet of the firebox. In this form of my structure numeral 32 denotes the radius of the turned-over metal of element 10, a welding edge being provided substantially at the end of the radius so as to line up with the edge of the opening cut in the firebox sheet against which it abuts. Plates 33 are let through the turned-over ends of element 10 in flush interlocked engagement with the metal walls thereof. The plates 33 are secured in their interlocked engagement to the sides of element 10 by staybolts 34, and the interlocking connection is such that substantially all strain is removed from the staybolts 34 other than they would normally be subjected to in holding the sides of element 10 together. The plates 33 are carried through openings 35 in the firebox wrapper sheet 11 and are turned over at their ends against wrapper sheet 11 at 36 in like manner as heretofore described in the preceding forms of my invention. The ends 36 as turned over against wrapper sheet 11, the interlocking connections between plates 33, and the sides of elements 10, are all welded in fluid tight engagement as noted in the drawings at "weld".

In this construction of my invention there is no flat extension or flange face beyond the end of the radius 32 of the turned-over edge of element 10 such as would provide an unsupported section of metal requiring staybolts to pass through it in maintaining its butt welded engagement free of tensile strains as specified by Federal and State boiler rules and regulations. This simplifies materially the formation of the butt welded engagement of my element with the firebox sheets over butt welding steaming and circulating elements as at present employed.

Passages 37 are shown in the wrapper sheet connecting plates 33 for the flow of water therethrough if desired in addition to the flow of water through element 10 at its juncture with the firebox sheets. In the views Figs. 17, 18 and 19, I have for illustrative purposes shown the element 10 as connected at its top end to crown sheet 16, although the same construction is equally applicable for connecting the bottom end of element 10 to the side sheet 15.

Any equivalent means of carrying the ends of element 10 through for connection to the wrapper sheet 11 while butt welding element 10 to the sheets of the firebox and without the necessity of staybolting the turned-over end 32 as provided by my structure, may be employed by me as I extend the use of my invention in practical service.

In the drawings, Figs. 16 to 19 inclusive, numeral 38 denotes a washout plug as used opposite the element ends for the purpose of flushing and cleaning the elements in ridding them of the impurities of the boiler feed water.

Now referring to Figs. 20 to 25 inclusive, which cover a novel form of my invention which I may utilize under certain conditions of service. This form I will choose to term the hand hole and manhole attachment of the element ends to the firebox wrapper sheet 11. In Figs. 20, 21 and 22, which cover the hand hole construction, numerals 12b and 12c denote how the end of element 10 is carried through the wrapper sheet 11, and turned over against wrapper sheet 11 so as to form circular hand hole openings with flanges 13b and 13c. The edges of the flanges 13b and 13c are joined to wrapper sheet 11 as noted at "weld", while the faces of the flanges 13b and 13c are arranged for joint formation with the faces of the removable hand hole covers 14b and 14c respectively. Openings 15b provide communication for the passage of water between the element 10 and the water spaces surrounding the firebox. This construction of my invention has certain advantages in washing out the elements 10 and providing relatively large inspection openings, being particularly adaptable in bad water districts.

The hand hole construction of Figs. 23, 24 and 25 is very much like the hand hole construction just described, except that the full end of element 10 is brought through the wrapper sheet 11, which offers an even clearer inspection of element 10 than the hand hole construction of Figs. 20, 21 and 22. The end of element 10 is turned over against wrapper sheet 11 with a flange 13d. Flange 13d has its face arranged for a joint and its edge bonded to the wrapper sheet 11 with a welded joint as noted in the drawings. A hand hole cover 14d is provided with a joint face and the faces of flange 13 and hand hole cover 14 are brought into joint formation, either directly or with a gasket between them, by a novel form of construction in which the heads of removable bolts 15d are drawn up against the edges of openings 16d in the end of element 10 in a simple and substantial manner. Openings 17d provide for the communication of fluid passage between the element 10 and the water spaces of the firebox to which it is attached. In the hand hole constructions of Figs. 20 to 25 inclusive, the element 10 is bonded in joint formation to the firebox sheet 20 through which it passes by welding as noted in the drawings.

I contemplate the use of my improved element 10 in either coal burning or oil burning fireboxes when employed as steaming and circulating elements between the side sheet 15 and the crown sheet 16 of the firebox, as the same is equally applicable to both fuels when applied above the mud ring of the firebox.

In addition to the novel structure of connections between hollow water circulating and steam generating elements with the sheets of a boiler, the invention provides a novel combination of such elements themselves. The use of elements connecting the side sheets and the crown sheet of the nature of those shown at 10, and the use of water tables of the nature of those shown at 10a has been known in separate structures prior to my present invention. I am not aware, however, that it has been known to use both these forms of elements in combination in a single boiler. Such combination is found to favorably modify the circulation of a boiler as compared with that resulting from the use of either alone. This is particularly true when one element 10, or pair thereof, is placed rather closely adjacent to the tube sheet as shown at the right in Feb. 1.

I desire it to be understood that tubular elements of circular or other cross-sections than the elongated cross-section element herewith illustrated and described may be utilized by me in adapting the construction and principles of my invention in practical service.

In speaking of the wrapper sheet of the firebox, I mean the outside shell surrounding the crown sheet and side sheets of the firebox not subjected to the heat of combustion.

Numerous ways and means will be found by those skilled in the art to apply the principles of my invention and I therefore do not restrict myself to the exact showings as herewith made, which are intended as illustrative embodiments, the scope of my invention being limited only by the extent of the claims as appended.

I claim:

1. A boiler structure comprising, in combination, spaced firebox and wrapper sheets, an upwardly trending hollow element located to directly expose at least one wall thereof to firebox heat, a portion adjacent one end of said element having its walls sealed to an opening in the firebox sheet, a portion forming in effect an extension of a wall of said element extending through the space between said sheets and through a slot in said wrapper sheet, the extremity of said portion clinched upon and secured to the exterior of the wrapper sheet adjacent said slot and means to place the interior of the element into circulatory communication with the water spaces of the boiler.

2. A boiler structure comprising, in combination, spaced firebox and wrapper sheets staybolted together, a hollow steaming and water-circulating element having at least one wall directly exposed to heat in the firebox, said element extending through and sealed to the edges of an opening in the firebox sheet and extending into the space between said sheets, opposite portions of the extremity of the element cut away to provide projecting plates, said plates extending through slots in the wrapper sheet and secured to the exterior of said sheets, a staybolt connecting the portion of the wrapper sheet between said slots to the firebox sheet, and means to place the interior of said element into circulatory communication with the water and steam spaces of the boiler.

3. A boiler structure comprising, in combination, spaced and staybolted firebox and wrapper sheets, a hollow steaming and water-circulating element having at least one wall directly exposed to heat in the firebox and in circulatory communication with the water spaces of the boiler, an end of said element extending through and sealed to the edges of an opening in the firebox sheet and extending into the space between said sheets, portions of the walls of said element adjacent its extremity cut away to provide projecting plates, said plates projecting through and sealed to the edges of slots in the wrapper sheet and secured to the exterior of said sheet, and a staybolt passing through an opening in a wall of said element and connecting the portion of said wrapper sheet between said slots with a portion of said firebox sheet adjacent said opening.

4. A boiler structure comprising, in combination, spaced firebox and wrapper sheets, a hollow steaming and water-circulating element, a portion thereof directly exposed to heat in the firebox, an end of said element flared outwardly upon relatively short radii of curvature, the edge of said curved portion at the ends of certain of said radii butt-welded to the edges of an opening in said sheet, a plate having its edges adjacent one end butt-welded to the edges of an opening in the wall of said element adjacent said flared portion, said plate extending through said first named opening, through the space between said sheets and its end secured to the wrapper sheet.

5. A boiler structure comprising, in combination, spaced firebox and wrapper sheets and a mud ring, a hollow relatively flat and elongated water bottom sloping downwardly and inwardly from the firebox sheet adjacent the mud ring, an open edge of said water bottom extending through and sealed to the edges of an opening in the firebox sheet, said water bottom having recesses in the edges of its walls to provide projecting plate portions, said portions extending through and sealed to the edges of slots in the wrapper sheets, the ends of said portions turned into contact with and secured to the exterior of the wrapper sheet adjacent said slots.

6. A boiler structure comprising, in combination, spaced firebox and wrapper sheets and a mud ring, a hollow relatively flat and elongated water bottom sloping downwardly and inwardly from the firebox sheet adjacent the mud ring, an open edge of said water bottom extending through and sealed to the edges of an opening in the firebox sheet, said water bottom having spaced pairs of recesses in the edges of its walls to provide parallel projecting plate portions, said portions extending through and sealed to the edges of slots in the wrapper sheets, the ends of said portions turned into contact with and secured to the exterior of the wrapper sheet adjacent said slots, and staybolts passing through the wrapper sheet between said slots, through openings in said plate portions and through the firebox sheet adjacent the water bottom.

7. A boiler structure comprising, in combination, spaced firebox and wrapper sheets, a water-circulating and steaming element, one end thereof extending through and sealed to the edges of an opening in the water leg portion of the firebox sheet, said end having an opening into the water leg and secured to the wrapper sheet, the remaining end extending through and sealed to the edges of an opening in the crown of the firebox sheet, through the space thereabove and secured to the wrapper sheet, said last named end having openings into said space one adjacent the crown sheet and other adjacent the wrapper sheet.

8. A boiler structure comprising, in combination, spaced firebox and wrapper sheets, a hollow steaming and water circulating element passing through and sealed to the edges of an opening in the firebox sheet and extending through the space between said sheets, portions of said element adjacent the end thereof cut away to provide plate-like projections and openings therebetween into said space, the ends of said portions passing through and secured to the exterior surface of the wrapper sheet.

9. A boiler structure comprising, in combination, spaced firebox and wrapper sheets, a hollow steaming and water circulating element passing through and sealed to the edges of an opening in the firebox sheet and extending through the space between said sheets, portions of said element adjacent the end thereof cut away to provide plate-like projections and openings therebetween into said space, the ends of said portions passing through and secured to the exterior surface of a plate, said plate secured in and closing an opening in the wrapper sheet.

10. A boiler structure comprising, in combination: spaced firebox and wrapper sheets; a curved tubular steaming and circulating element exposed to heat within the firebox and communicating with the spaces between said sheets; the tubular walls of said element at one end fitting freely through an opening in the crown sheet of the firebox and at the opposite end fitting freely through a lower firebox sheet; said element having its center line curved concave toward said openings; portions less than the whole of the tubular walls symmetrically arranged about a major diameter of the tubular section connected to the wrapper sheet; and a welded joint for sealing the tubular walls around said openings.

11. A boiler structure comprising, in combination: spaced firebox and wrapper sheets; a curved tubular steaming and circulating element exposed to heat within the firebox and communicating with the spaces between said sheets; the tubular walls of said element at one end fitting freely through an opening in the crown sheet of the firebox and at the opposite end fitting freely through a lower firebox sheet; a portion of the tubular wall at each end of said element having a cross-sectional area of metal connected to the wrapper sheet less than the cross-sectional area of metal encompassed by said openings; said element having its center line curved concave toward said openings; and a welded joint for sealing the tubular walls around said openings.

12. A boiler structure comprising, in combination: spaced firebox and wrapper sheets; a curved bottom-forming tubular steaming and circulating element exposed to heat within the firebox and communicating with the space between said sheets; the tubular wall of said element fitting freely through an opening in the firebox sheet immediately above the mud ring of the firebox; said element having its center line curved concave toward said opening and mud ring; portions less than the whole of the tubular walls symmetrically arranged about a major diameter of the tubular section connected to the wrapper sheet; and a welded joint for sealing the tubular wall around said opening.

13. A boiler structure comprising, in combination: spaced firebox and wrapper sheets; a steaming and circulating element exposed to heat within the firebox and communicating with the spaces between said sheets; an end of said element having a tubular wall fitting freely through an opening in the firebox sheet; means for holding the tubular wall in said opening comprising portions of said wall situated symmetrically about a major diameter of the tubular cross-section and connected to the wrapper sheet, said portions having a cross-sectional area less than the area of the tubular cross-section; and a welded joint sealing the tubular wall around said opening.

JESSE C. MARTIN, Jr.